No. 703,655. Patented July 1, 1902.
H. C. HAPPOLD.
FOCUSING HOOD FOR PHOTOGRAPHIC CAMERAS.
(Application filed Apr. 16, 1902.)

(No Model.)

Witnesses:
Arthur Zueipe
Edward Ray

Inventor:
Henry C. Happold
by his attorneys
Roeder & Brieren

UNITED STATES PATENT OFFICE.

HENRY C. HAPPOLD, OF NEW YORK, N. Y.

FOCUSING-HOOD FOR PHOTOGRAPHIC CAMERAS.

SPECIFICATION forming part of Letters Patent No. 703,655, dated July 1, 1902.

Application filed April 16, 1902. Serial No. 103,084. (No model.)

*To all whom it may concern:*

Be it known that I, HENRY C. HAPPOLD, a citizen of the United States, and a resident of New York city, county and State of New York, have invented certain new and useful Improvements in Focusing-Hoods for Photographic Cameras, of which the following is a specification.

This invention relates to a focusing-hood for photographic cameras which may be readily distended and collapsed and which may be securely clamped to the camera. In this way the hands of the operator remain entirely free and may be used exclusively for properly focusing the object to be photographed.

Figure 1:
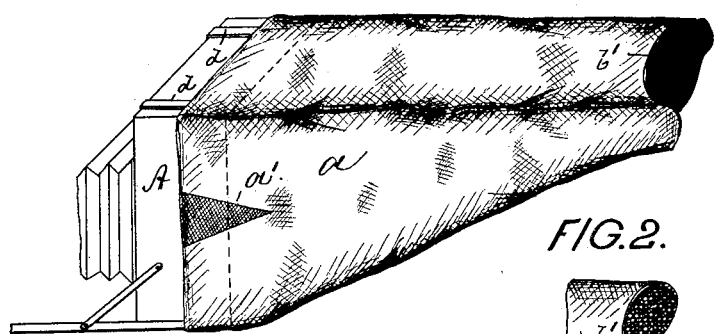
Figure 2:
Figure 3:
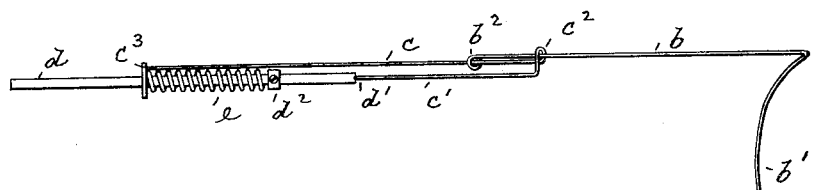
Figure 4:
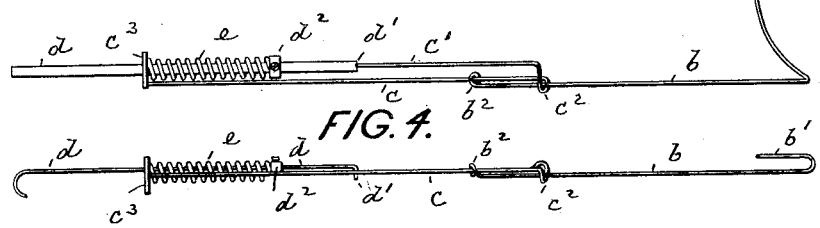

In the accompanying drawings, Figure 1 is a perspective view of my improved focusing-hood; Fig. 2, a detail of the sight-opening; Fig. 3, a plan of the frame, showing it extended; Fig. 4, a side view thereof; and Fig. 5, a side view of the frame, showing it contracted.

The letter $a$ represents a tubular flexible cover, which is adapted to close around the camera A at one end and is contracted to form the sight-opening at the other end. The wide end of the cover $a$ is provided with elastic gores $a'$ to insure a tight fit around the body of the camera. In order to stiffen the cover and hold it to the camera in a proper horizontal position, it is provided with an extensible supporting-frame secured to the inner face of its upper side. This frame is shown more fully in Figs. 3 to 5. It is composed, essentially, of a bail $b$, made approximately U-shaped and having a concave cross-arm $b'$, that conforms to the shape of the forehead and properly shapes the sight-opening. The two ends of the bail $b$ are coiled to form eyes $b^2$. These eyes embrace each one arm $c$ of a two-armed slide $c\ c'$, which is bent at one end to form an eye $c^2$, that in turn embraces bail $b$. The other end of the slide carries a catch or abutment $c^3$, adapted to engage the rear side of the camera A.

The catches $c^3$ are perforated to accommodate the shanks of hooks $d$, which are adapted to engage the front side of the camera. These hooks move along the second arm $c'$ of the slide and are perforated at $d'$ to embrace said arm. Upon the hook $d$ is mounted between the abutment $c^3$ and an adjustable collar $d^2$ a coiled spring $e$, which tends to draw the hook toward the abutment $c^3$ and to thus clamp the frame to the camera. By adjusting the collar $d^2$ the tension of the spring and the play of the hook may be regulated to fit cameras of different sizes.

Figure 5:

When the hood is carried about, the slide $c\ c'$, as well as the hook $d$, is pushed toward the cross-arm $b'$, Fig. 5, so that the cover and frame are collapsed, and the device occupies but a small space.

To apply the hood, the slide is drawn out along the bail and the hook is drawn out along the slide, so that the frame and cover become distended. The camera is now grasped between the hook and the abutment $c^3$, so that the hood is firmly held in place, while the hands of the operator are entirely free, and full attention may be paid to the proper focusing of the object.

What I claim is—

1. A focusing-hood composed of a flexible cover, a bail, a slide having an abutment and movable upon the bail, and a spring-influenced hook movable upon the slide, substantially as specified.

2. A focusing-hood composed of a flexible cover, a bail, a two-armed slide, means for guiding one arm of said slide along the bail, a spring-influenced hook movable upon the other arm of the slide, and a perforated abutment on the slide engaging the hook, substantially as specified.

Signed by me at New York city, New York, this 15th day of April, 1902.

HENRY C. HAPPOLD.

Witnesses:
F. V. BRIESEN,
WILLIAM SCHULZ.